Nov. 24, 1970 B. BRIGHTMAN 3,542,958

LINK CIRCUIT WITH HIGH LEVEL RINGING CAPABILITY FOR ELECTRONIC TELEPHONE EXCHANGE

Filed Aug. 22, 1967 2 Sheets-Sheet 1

INVENTOR
BARRIE BRIGHTMAN

BY Hoffman Stone

ATTORNEY

Nov. 24, 1970 B. BRIGHTMAN 3,542,958

LINK CIRCUIT WITH HIGH LEVEL RINGING CAPABILITY
FOR ELECTRONIC TELEPHONE EXCHANGE

Filed Aug. 22, 1967 2 Sheets-Sheet 2

INVENTOR.
BARRIE BRIGHTMAN
BY Hoffman Stone
ATTORNEY

United States Patent Office 3,542,958

Patented Nov. 24, 1970

3,542,958

LINK CIRCUIT WITH HIGH LEVEL RINGING CAPABILITY FOR ELECTRONIC TELEPHONE EXCHANGE

Barrie Brightman, Webster, N.Y., assignor to Stromberg-Carlson Corporation, Rochester, N.Y., a corporation of Delaware Filed Aug. 22, 1967, Ser. No. 662,418
Int. Cl. H04q *3/42*
U.S. Cl. 179—18 8 Claims

ABSTRACT OF THE DISCLOSURE

A crosspoint-type link circuit for an electronic telephone exchange including matrices of transistors defining switch crosspoints in a balanced circuit configuration. A 120 volt D.C. source, balanced relative to ground, is connected in one polarity across the matrices on the ING (calling, or originating) side of the conventional bridge transformer and in the opposite polarity across the matrices on the ED (called) side. For ringing, the called line is switched at the desired ring signal frequency between the ING and the ED matrices. An A.C. signal is thus applied to the line without making the crosspoint switches bi-directionally conductive.

BRIEF SUMMARY OF THE INVENTION

Figure 1:
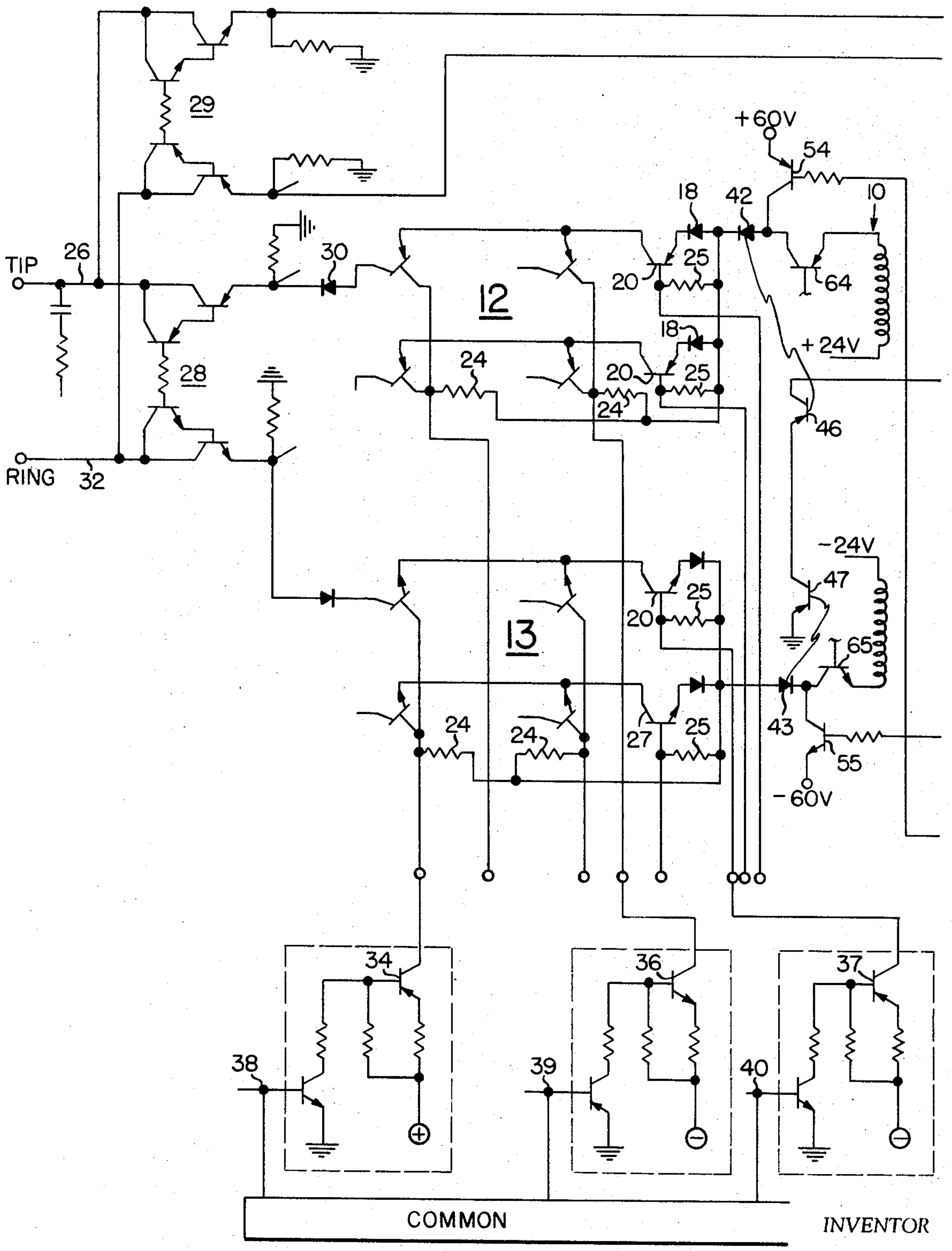

This invention relates to a novel method of and apparatus for transmitting high level A.C. ringing signals through a solid state switching link in a telephone switching circuit, and, more particularly, to an arrangement of this kind for use where the switching devices are simple uni-directionally conducting transistors.

There is a present emphasis on the development of electronic telephone exchange systems using solid state electronic devices for switching. One problem in systems of this type relates to the provision of means for ringing a called subscriber's telephone. In general, it has not heretofore appeared to be practically feasible with equipments of this type to trasmit high level ringing signals of about 90 volts RMS similar to the signals used for ringing telephones connected to mechanical switching stations. Instead, the usual proposal has been either to provide a separate ring signal switching network at the central office auxiliary to the electronic switching system, or to transmit a relatively low level tone signal through the electronic switching equipment and amplify the signal at the local telephone station. The latter procedure has been the one usually followed despite the cost of the additional equipment needed at the subscribers' sub-sets.

The present invention provides a fairly simple and inexpensive arrangement whereby in an electronic exchange, wherein the switching points are constituted by simple transistors, high level ringing signals may be transmitted through the transistors, and an alternating current ringing signal of the conventional 85 volt to 90 volt RMS magnitude may be applied to the subscribers' lines. By relatively simple switching techniques, an A.C. signal is produced using only uni-directionally conducting switches.

The present invention constitutes an improvement in the electronic exchange arrangement described and claimed in my co-pending patent application, Ser. No. 566,830 filed July 21, 1966, now Pat. No. 3,489,856 and entitled, "Solid State Space Division Switchboard" (S/C Docket No. D-3112). A link circuit is disclosed in that application including four matrices of transistors, each matrix being arranged in a crosspoint pattern. The tip conductor of each subscriber's line is connected to the collector of a transistor in a matrix on one side of the conventional bridge transformer, denoted the calling side, and to the collector of a corresponding transistor in the complementary matrix on the opposite side of the transformer, denoted the called side. Similarly, the ring lead of each line is connected to the collectors of corresponding transistors in respective ones of the two other matrices on opposite respective sides of the transformer. The transistors are selectively driven between cut-off and saturation responsively to control signals applied in a coordinate selection arrangement selectively to connect the various different lines individually to the bridge transformer, normally one line to the calling side and another line to the called side.

The present invention contemplates a link circuit generally similar to the one described and claimed in the hereinabove identified co-pending application in that it includes four matrices of simple transistors arranged to define switching crosspoints, but different in respect of the biasing and coordinate selection arrangements, and especially in that it includes certain added circuitry that enables the application of an A.C. ringing signal of conventional 80 to 90 volts RMS magnitude to a called subscriber's line.

Briefly, in accordance with the invention, the ringing signal is generated by alternately switching a 120 volt D.C. source, typically balanced relative to ground, across the called subscriber's line, applying it first in one direction, then in the opposite direction at the conventional 20 Hz. rate. This is done by connecting the 120 volt source across input terminals of the calling matrices in one direction, and across input terminals of the called matrices in the opposite direction, and then switching the called line between the calling and the called matrices at the 20 Hz. rate. The calling line is preferably switched synchronously in complementary fashion and is fed a ring-back tone signal.

DETAILED DESCRIPTION

Figure 2:
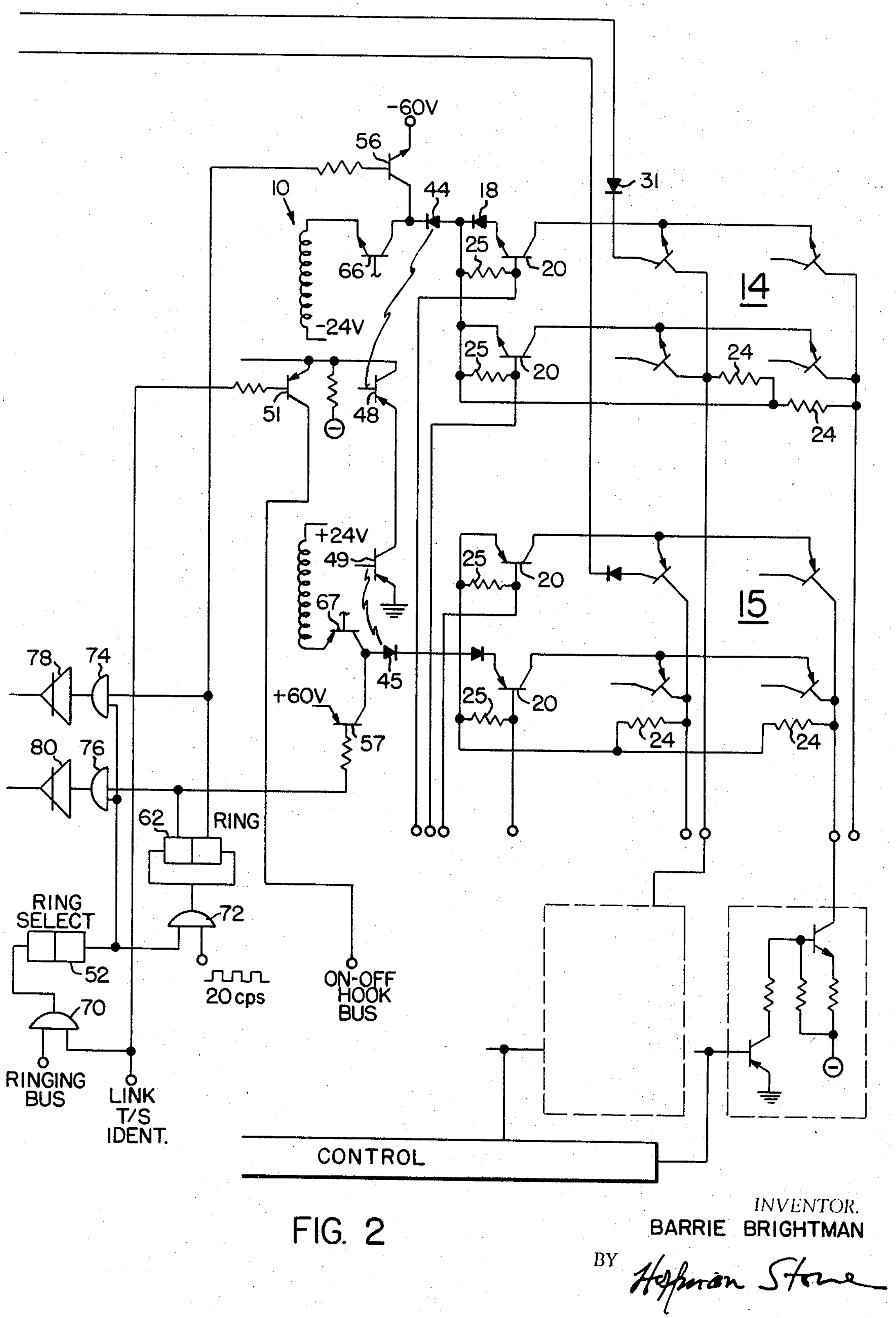

A presently preferred embodiment of the invention will now be described in connection with the accompanying drawings, wherein: the two Figures, juxtaposed, with FIG. 1 to the left of FIG. 2, constitutes a schematic circuit diagram of a link circuit according to a presently preferred embodiment of the invention.

One link circuit like the one shown in the drawings would be included in an exchange or switchboard for each separate simultaneous connection it is desired to provide for. For example, a switchboard serving 100 lines might include twelve link circuits so that twelve separate connections could be made simultaneously through the switchboard.

The circuit shown includes a standard bridge transformer 10, two matrices 12 and 13 of switching transistors connected on the calling side of the transformer, and two matrices 14 and 15 of switching transistors connected in complementary fashion on the called side of the transformer. The upper matrix 12 on the calling side of the transformer consists of PNP transistors, and its complementary matrix 14 on the called side of the transistor consists of NPN transistors. Similarly, the lower matrix 13 on the calling side is made up of NPN transistors, while its complementary consists of PNP transistors. The arrangement is symmetrical.

Each row of transistors in each matrix is connected through a separate diode 18 and a ROW switching transistor 20 to one end terminal of the bridge transformer 10. The main battery (designated by +24 v. and −24 v.) of the exchange is connected between the center terminals of each of the split windings of the transformer 10 in the conventional way, in one polarity on the calling side and in the opposite polarity on the called side. The transistors in all of the matrices 12–15, and all of the ROW switching transistors 20 are normally biased at cut-off by the battery voltage applied through resistors 24 and 25, respectively, connected between the bases of the transistors and the end terminals of the bridge transformer 10.

The tip lead 26 of each line, only one of which is shown, is connected through isolation circuits 28 and 29 and protective diodes 30 and 31 to the collector of one transistor in the first matrix 12 on the calling side of the link, and to the collector of the corresponding transistor in the corresponding matrix 14 on the called side of the link. The ring lead 32 is connected in similar fashion to the collectors of transistors in the second matrix 13 and its complementary matrix 15.

The bases of the transistors in each column of each matrix are connected together and to the collector of a COLUMN-SELECT switching transistor 34 or 36. Similarly, the base of each of the ROW switching transistors 20 is connected to the collector of a separate ROW-SELECT transistor 37, only one of which is shown.

The COLUMN-SELECT and the ROW-SELECT transistors 34, 36, and 37, respectively, are connected in generally similar circuit arrangements as shown to provide high impedance sources for turning the respective matrix and ROW switching transistors positively ON responsively to signals received at control input terminals 38, 39, and 40, respectively, from control equipment that forms no part of the present invention and is not described herein. The control equipment may be of any desired type arranged to produce coordinate selection signals for application at the control input terminals 38–40.

Typically, the control equipment applies signals to switch ON one column of transistors in each matrix and one of the ROW switching transistors associated with each matrix to effect a connection between two subscribers' lines. The arrangement is generally similar to one shown in the hereinabove identified copending application except for the connection through the resistors 24 and 25 that provide positive cut-off bias for the matrix transistors, and for the control input circuits including the transistors 34, 36, and 37, which serve to reduce insertion loss to values even smaller than heretofore achieved by reason of the high impedance nature of their collector outputs.

The biasing arrangement for the transistors in the matrices 12–15 includes the resistors 24 connected between the bases of the transistors and the transformer side of the diodes 18 that are connected between the ROW switching transistors 20 and the bridge transformer 10. When one of the ROW switching transistors 20 is turned ON, the voltage drop across its diode 18 is applied through the resistors 24 to place a reverse bias across the emitter junctions of all of the transistors in the row of the matrix controlled by the particular ROW switching transistor, except for the one turned ON by the COLUMN-SELECT signal. Crosstalk is thus minimized.

The control circuit typically scans all of the lines in the link repeatedly, and stops responsively to an off-hook signal when one is found. In accordance with the present invention, off-hook detection is accomplished by light emitting diodes 42 and 43, and 44 and 45, which are connected between the respective matrices and the four end terminals of the transformer 10, and are optically coupled to respective light sensitive transistors 46 and 47, and 48 and 49. The light sensitive transistors 46–49 are coupled to a common off-hook signal output transistor 51. When one of the lines goes off-hook, it completes a circuit across the main office battery through the winding of the bridge transformer 10 on the side of the link used for scanning, the light emitting diodes 42 and 43, or 44 and 45, the selected ROW-SELECT transistors 20 and the selected matrix transistors.

The control equipment then allots the link to the off-hook line, and makes a register available to it. The register receives the signals from the subscriber indicating the identity of a called line, and relays the identity to the common control after the last digit has been received and the conventional busy test completed. The common control then applies signals to select the called line's transistors in the called matrices 14 and 15, and to drive the RING SELECT flip-flop 52.

The ringing action is one of complementary switching at the ringing frequency. The 120 volt D.C. battery, balanced with respect to ground, is connected in one polarity across the calling side of the link, and in the opposite polarity across the called side. The calling subscriber and the called subscriber are switched back and forth between the calling and the called matrices at, typically, a twenty cycle rate, and the 120 volt battery connections are switched synchronously to apply the battery alternately in successively opposite polarities to the called line, while the main office battery is similarly applied across the calling line. The called line receives an 85–90 volt RMS ring signal. The calling line receives a 35 volt RMS ring-back tone. Preferably, the ring-back tone is attenuated to a desirable low level by a series resistor arrangement (not shown) as will be recognized by those familiar with the art.

The 120 volt battery is connected across the matrices 12–15 through switching transistors 54 and 55, and 56 and 57, respectively, which are normally biased to cut-off and are periodically driven to saturation during a ringing period by the RINGING flip-flop 62. The RINGING flip-flop 62 also controls isolating transistors 64 and 65, and 66 and 67 connected between the bridge transformer 10 and the battery switching transistors 54–57, respectively, to prevent application of the 120 volt battery across the windings of the bridge transformer 10. When the switching transistors 54–57 are switched ON, the corresponding respective isolating transistors 64–67 are switched OFF.

The major essential features of the circuit have now been described. Further details will become apparent in the following description of its operation once the common control equipment has received the called subscriber's identity from the register. The transistors in the called matrices 14 and 15 to which the called subscribers line is connected are switched ON by application of signals to the proper ones of the input terminals 38, 39, and 40. The common control applys a partially enabling signal of brief duration to one input of the gate 70 at the input of the RING SELECT flip-flop 52. The second input to the gate 70 is the link time slot identifying pulse, which then sets the RING SELECT flip-flop 52. The RING SELECT flip-flop 52, when set, partially enables the gate 72 at the input of the RINGING flip-flop 62 so that the RINGING flip-flop 62 may be driven by the typically 20 Hz. signal generated by the ring frequency generator (not shown) and applied to the second input of the gate 72.

The RING SELECT flip-flop 52, when set, also partially enables gates 74 and 76, respectively, connected between the outputs of the RINGING flip-flop 62 and a pair of invertors 78 and 80, respectively, through which the outputs of the RINGING flip-flop 62 are directed to the switching transistors 54 and 55 on the calling side of the link.

The RINGING flip-flop 62 initially switches ON the main switching transistors 56 and 57 on the called side of the link, and holds them ON until the RINGING flip-flop 62 is re-set responsively to the 20 Hz. signal or otherwise.

While the main switching transistors 56 and 57 are held ON, the isolating transistors 66 and 67, respectively, on the same side of the link are held OFF by the RINGING flip-flop 62 so that during this period, the 120 volt battery is connected to the called line through the called matrices 14 and 15, and is isolated from the called winding of the bridge transformer 10.

When the RINGING flip-flop 62 is re-set, it reverses the situation at the called side of the link, turning the switching transistors 56 and 57 OFF and restoring the isolating transistors 66 and 67 to their ON condition. Simultaneously, it turns ON the switching transistors 54 and 56 on the calling side of the matrix and switches OFF the isolating transistors 64 and 65 on the calling side.

The common control is arranged to switch its control output synchronously with the setting and the re-setting of the RINGING flip-flop 62 to switch the called line always to the matrices to which the 120 volt battery is applied, and in complementary fashion synchronously to switch the calling line to the opposite matrices from the ones to which the called line is connected.

During ringing, the current drawn by the called line is relatively small, and is insufficient to trigger the off-hook detector constituted by the light emitting diodes 42–45 and photo transistors 46–49. When the called subscriber goes off-hook, the resulting increase of current in his line increases the light output of the light emitting diodes 42–45. This is detected by the photo-transistors 46–49, which turn ON the off-hook output transistor 51 to apply a signal to the on-off hook data bus 84 of the common control. The common control then applies a second pulse to the RING SELECT flip-flop 52 to re-set it. The RING SELECT flip-flop 52 then inhibits the gates 74 and 76 and re-sets the RINGING flip-flop 62. All of the main switching transistors 54–57 are thus cut off, and the isolating transistors 64–67 are turned ON. The common control simultaneously switches the calling subscriber to the ING matrices 12 and 13 and the called subscriber to the ED matrices 14 and 15, and maintains the connection until the off-hook signal is removed from the data bus 84.

What is claimed is:

1. A link circuit for use in a communications switching system or the like comprising:

(a) a bridge transformer, (b) first and second matrices of transistors connected to define switching crosspoints, the transistors of said first matrix being of PNP conductivity type, and the transistors of said second matrix being of NPN conductivity type, (c) means connecting the collectors of corresponding transistors in said first and second matrices to respective common terminals for connection to outgoing lines, (d) switch means for alternately connecting and disconnecting the emitters of all the transistors in a selected row of said first matrix to one terminal of said transformer, (e) switch means for alternately connecting and disconnecting the emitters of all the transistors in a selected row of said second matrix to a terminal of said transformer on the opposite side thereof from said one terminal, (f) third and fourth matrices of transistors symmetrically connected relative to said first and second matrices, the transistors of said third matrix being of NPN conductivity type and those of said fourth matrix being of PNP conductivity type, (g) means connecting the collectors of corresponding transistors of said third and fourth matrices to respective common line terminals different from the common terminals to which the transistors of said first and second matrices are connected, (h) switch means for alternately connecting and disconnecting the emitters of all the transistors in a selected row of said third matrix to the other terminal of said transformer on the same side thereof as the terminal to which the transistors of said first matrix are connectible, (i) switch means for alternately connecting and disconnecting the emitters of all the transistors in a selected row of said fourth matrix to the other terminal of said transformer on the same side thereof as the terminal to which the transistors of said second matrix are connectible, (j) a source of direct current, and (k) ring signal switch means for alternately connecting said source first between the emitters of said transistors in the selected row of said first matrix and the emitters of said transistors in the selected row of said third matrix, and second between the emitters of said transistors in the selected rows of said second and fourth matrices.

2. A link circuit according to claim 1 wherein said source of direct current has a voltage of about 120 volts.

3. A link circuit according to claim 1 wherein all of said switching means are constituted by transistors arranged with their emitter-collector paths in series with the circuits to be switched.

4. A link circuit for use in a telephone exchange or the like comprising:

(a) plural matrices of transistors connected in coordinate arrays defining switching crosspoints, the bases of the transistors in each column of each of said matrices being connected directly together and to a first source of a control signal, (b) the collectors of said transistors being individually connected to separate terminals for connection to outgoing lines, (c) row select transistors, the emitters of the transistors in each row of said matrices being connected together and to the collector of a separate one of said row select transistors, (d) means connecting the emitters of all of said row select transistors in each matrix to respective common terminals, (e) means for connecting a source of energizing current between two of said common terminals, (f) diodes connected respectively in series between the emitters of said row select transistors and said common terminals, (g) the bases of all the transistors of each column of said matrices being connected directly together and through a common resistor, one for each column, to said common terminals in their respective matrices, whereby when one of said row select transistors conducts, the voltage drop across the diode connected in series with its emitter back biases all of the transistors in the matrix except those to the bases of which a column select signal is applied.

5. A link circuit for use in a telephone exchange or the like comprising:

(a) a matrix of transistors connected in a coordinate array defining switching crosspoints, and (b) a drive circuit for selectively and controllably biasing selected ones of the transistors of said matrix to saturation, said drive circuit including a transistor having its emitter connected to a source of energizing current, its collector connected to the bases of selected transistors in said matrix, and its base to a terminal for receiving a control signal.

6. An off-hook detector arrangement for a solid state link circuit for a telephone exchange or the like of the type including matrices of solid state switching devices for effecting connections between selected outgoing and incoming lines comprising:

(a) a light emitting diode connected in series between the main battery of the exchange and one of the matrices of switching devices, (b) a photo-responsive transducer for producing an electrical signal responsively to light emitted by said diode, and (c) means responsive to a signal produced by said transducer for selectively biasing and energizing selected ones of the swtching devices to complete a connection through the link.

7. A link circuit for use in a communication switching system or the like comprising:

(a) line terminals for connection to two-wire outgoing lines, (b) four matrices of transistors, each matrix including a plurality of transistors connected according to a planar, two-coordinate array with one transistor at each crosspoint, (c) means connecting each of said line terminals separately to the collector of one transistor in a first one of said matrices and to the collector of a transistor in a second one of said matrices, the two terminals for each line being connected to transistors in different respective matrices, (d) said matrices being arranged in two pairs, each pair including connections to both terminals of each outgoing line, (e) the emitters of all the transistors in each row of said matrices being connected together, (f) ring terminals, one for each of said matrices, (g) means for selectively connecting the emitters of the respective rows of transistors to said ring terminals, (h) a source of direct current, (i) means for alternately at a predetermined rate applying said source first between the two of said ring terminals associated with one pair of said matrices and then between the two of said ring terminals associated with the other pair of said matrices, and (j) control means synchronized with said applying means for operating said matrices to switch said source to a selected pair of said line terminals alternately at said predetermined rate first in one polarity through said one pair of said matrices and then in the opposite polarity through said other pair.

8. A link circuit according to claim 1 including also means synchronized with said ring signal switch means for isolating said bridge transformer from said source.

References Cited

UNITED STATES PATENTS

| | | | |
|---|---|---|---|
| 3,251,036 | 5/1966 | Smith | 340—166 |
| 3,406,262 | 10/1968 | Grandstaff | 179—84 |

KATHLEEN H. CLAFFY, Primary Examiner

W. A. HELVESTINE, Assistant Examiner